（12）United States Patent
Benoit et al.

(10) Patent No.: US 6,179,539 B1
(45) Date of Patent: Jan. 30, 2001

(54) LOCKING CLIP WITH MOVEABLE COLLET

(75) Inventors: Thomas A. Benoit, Bourbonnais; Charles Meyer, New Lenox, both of IL (US)

(73) Assignee: Illinois Tool Works Inc., Glenview, IL (US)

( * ) Notice: Under 35 U.S.C. 154(b), the term of this patent shall be extended for 0 days.

(21) Appl. No.: 09/394,390

(22) Filed: Sep. 9, 1999

(51) Int. Cl.⁷ .................................................. F16B 37/08
(52) U.S. Cl. ........................... 411/433; 411/437; 411/278
(58) Field of Search .................................... 411/433, 437, 411/278, 41, 45, 908, 280, 277, 276

(56) References Cited

U.S. PATENT DOCUMENTS

| 351,474 | * | 10/1886 | Stevens | 411/433 |
|---|---|---|---|---|
| 1,475,907 | * | 11/1923 | Volman | 411/433 |
| 2,367,480 | * | 1/1945 | Beswick | 411/433 |
| 4,518,297 | | 5/1985 | Kraus . | |
| 4,524,934 | * | 6/1985 | Rumble | 411/433 |
| 4,541,602 | | 9/1985 | Potzas . | |
| 4,550,891 | | 11/1985 | Schaty . | |
| 4,840,333 | | 6/1989 | Nakayama . | |
| 4,850,778 | * | 7/1989 | Clough | 411/433 |
| 4,859,129 | | 8/1989 | Kraus . | |
| 4,899,964 | | 2/1990 | Sick . | |
| 5,002,243 | | 3/1991 | Kraus et al. . | |
| 5,033,701 | | 7/1991 | Kraus . | |
| 5,197,840 | * | 3/1993 | Peek | 411/433 |
| 5,271,587 | | 12/1993 | Schaty et al. . | |
| 5,460,342 | | 10/1995 | Dore et al. . | |
| 5,568,906 | | 10/1996 | Hahn et al. . | |
| 5,588,683 | | 12/1996 | Schliessner . | |

FOREIGN PATENT DOCUMENTS

325069  *  7/1989  (EP) ..................................... 411/433

* cited by examiner

Primary Examiner—Flemming Saether
(74) Attorney, Agent, or Firm—Pitney, Hardin, Kipp and Szuch LLP

(57) ABSTRACT

The clip of the present invention includes a plurality of internally threaded legs which form an aperture for receiving an externally threaded stud or similar structural device. A moveable circular collet is attached to a plunger and travels from a pre-driven position wherein the collet is substantially free from engagement with the internally threaded legs and allows for flexure of the internally threaded legs and a fully driven position wherein the collet engages the internally threaded legs in a locked position, inhibiting flexure and engaging the externally threaded stud.

7 Claims, 8 Drawing Sheets

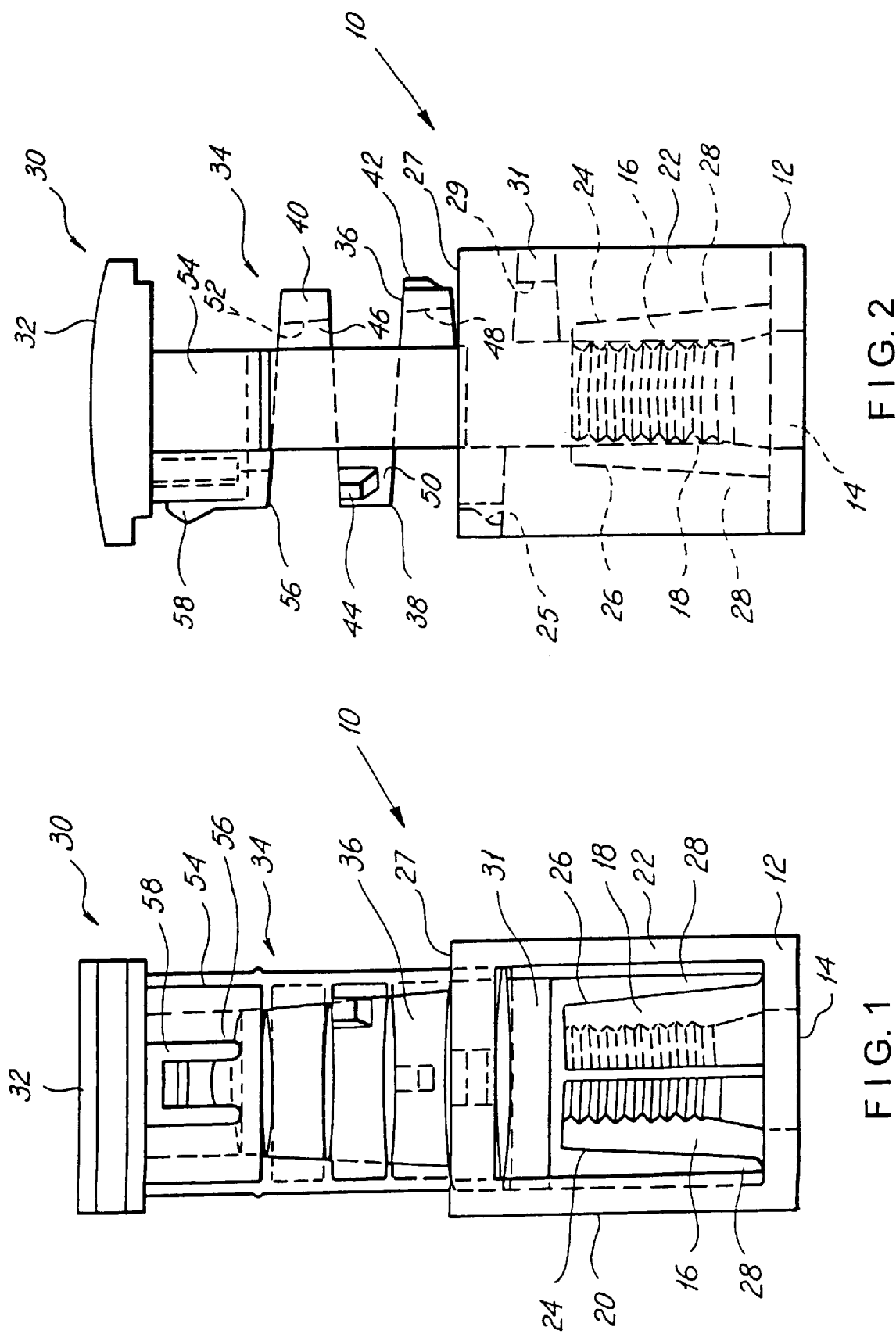

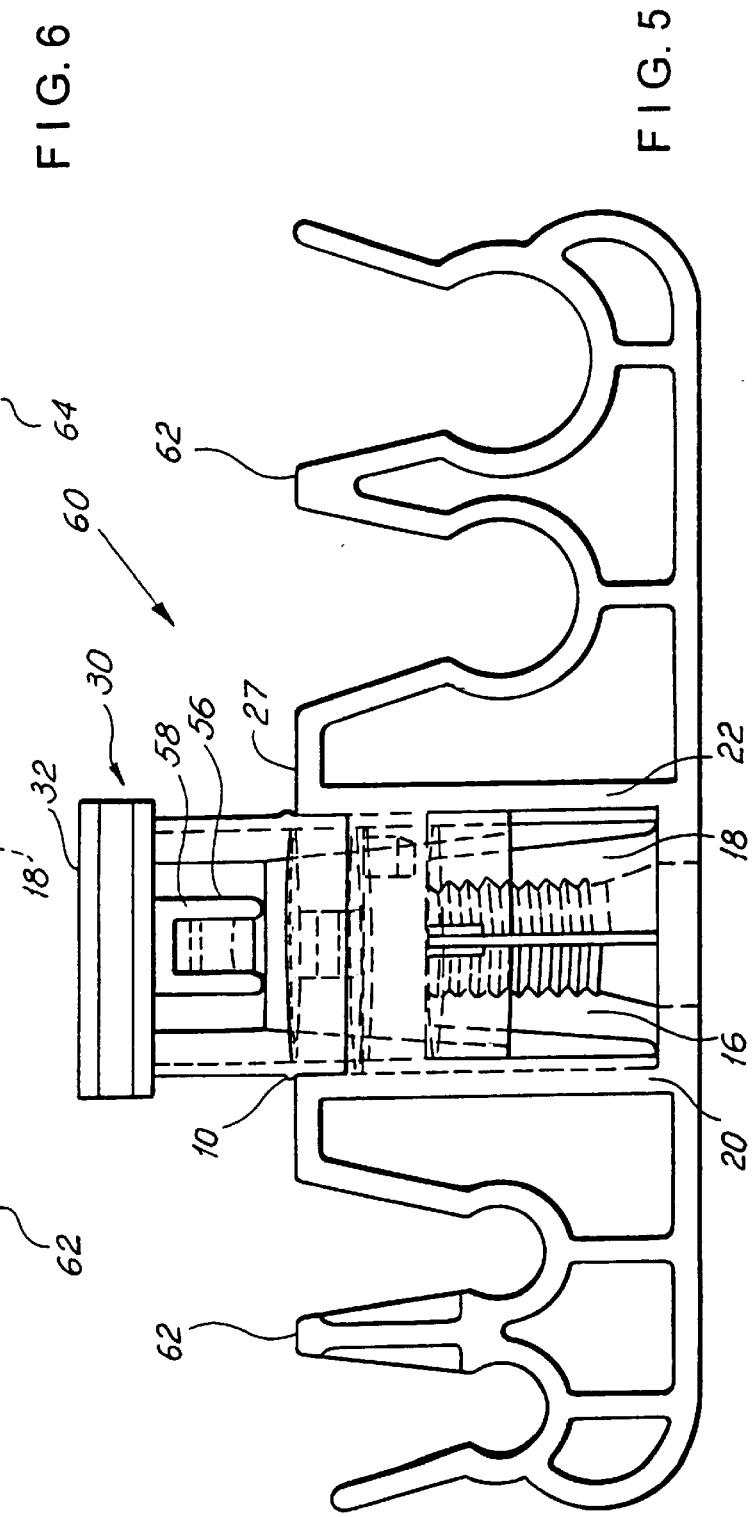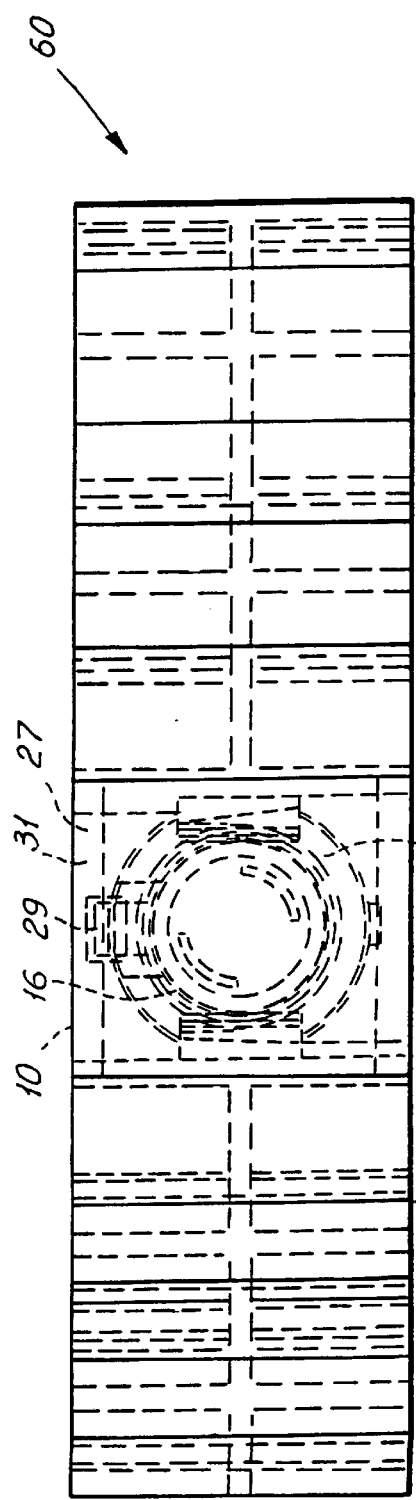

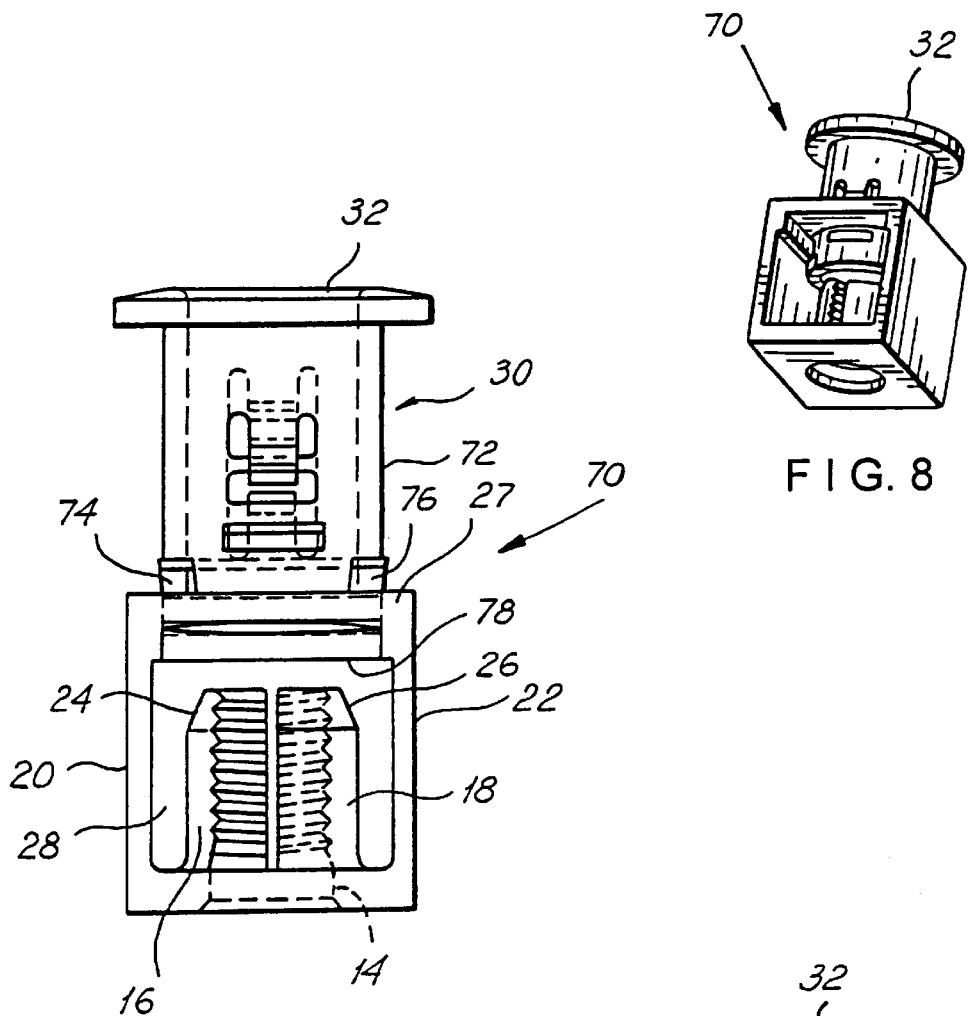
FIG. 8
FIG. 9
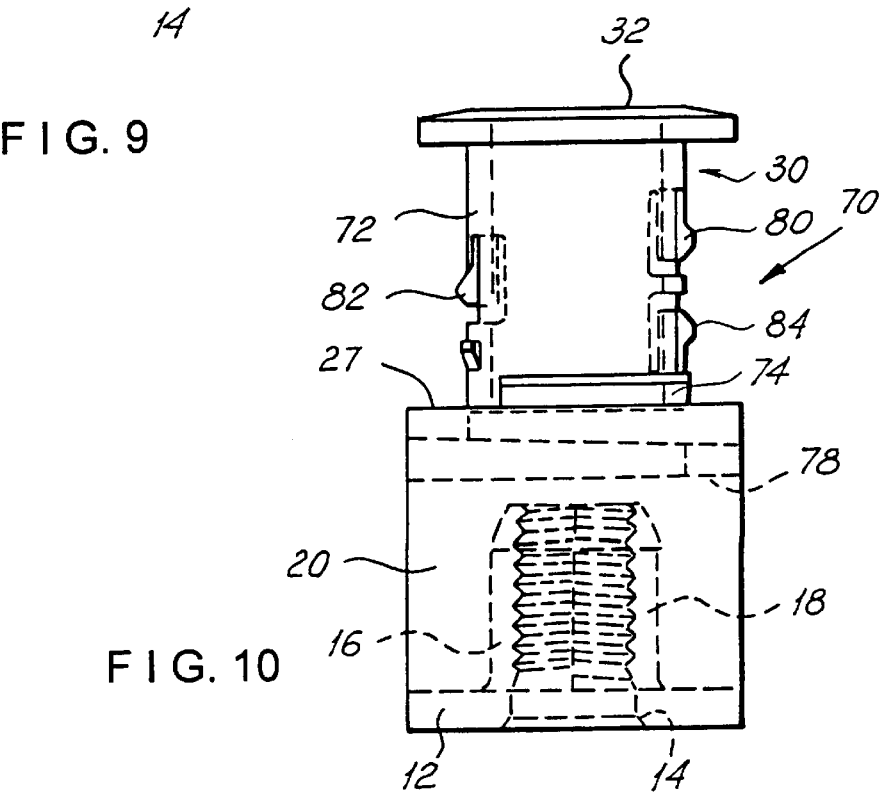
FIG. 10

LOCKING CLIP WITH MOVEABLE COLLET

BACKGROUND OF THE INVENTION

1. Field of the Invention

This invention pertains to a locking clip with a base with multiple internally threaded legs and a moveable collet to encircle the legs in an engaged position.

2. Description of the Prior Art

In the prior art, it is known to design a clip, such as a pipe clip, rod end clip or a similar clip. These prior art clips frequently require a rotational or screwing movement to engage the internal threads of the clip to an externally threaded structural member such as a threaded stud or bolt-like structure. This requires a relatively lengthy installation procedure including rotational movement which can ultimately be very costly in assembly-line production, such as automotive manufacturing. Similarly, many prior art clips comprise a plurality of individual parts. This adds to the complexity to the manufacturing, packaging, shipping and installation of the clips.

Some examples of clips in the prior art include U.S. Pat. No. 5,460,342 entitled "Retainer Element, Specifically for Motor Vehicle Bodies" issued on Oct. 24, 1995 to Dore et al.; U.S. Pat. No. 5,271,587 entitled "Clip for Pipes and Cables" issued on Dec. 21, 1993 to Schäty et al.; U.S. Pat. No. 4,541,602 entitled "Pipe Clip" issued on Sep. 17, 1985 to Potzas et al.; and U.S. Pat. No. 4,518,297 entitled "Molded Plastic Socket with Easy-On Hard-Off Stud Engager" issued on May 21, 1985 to Kraus.

OBJECTS AND SUMMARY OF THE INVENTION

It is therefore an object of this invention to provide a clip, such as a pipe clip, a rod end clip or a similar clip, which can be installed with a minimum of rotational movements, particular when engaging an externally threaded structural element such as a stud or bolt-like structure.

It is therefore a further object of this invention to provide a clip, such as a pipe clip, a rod end clip or a similar clip, which can be easily installed and is well-adapted for assembly line installation.

It is therefore a still further object of this invention to provide a clip, such as a pipe clip, a rod end clip or a similar clip, which can be manufactured, packaged, shipped and installed as a single piece.

It is therefore a still further object of this invention to provide a clip, such as a pipe clip, a rod end clip or a similar clip, which can be economically manufactured.

These and other objects are attained by providing a clip which includes multiple internally threaded legs on a base element and a moveable collet to encircle the legs in the installed position. Preferably, the collet is molded integrally with the base in the manufacturing process. The collet is then pre-driven to a position that limits the deflection of the threaded legs when the clip is installed on the stud. Matching tapers on the outside of the legs and the inside of the collet allow this limited deflection. Tabs and protrusions hold the collet in the desired position. The threaded legs are flexible and are designed to partially surround the stud. Upon installation, the internal taper of the legs center the clip on the stud. The limited travel of the legs provides audible and tactile feedback to the installer and ensures proper mating of the threaded stud to the threaded legs. Once the clip is fully against the panel, the installer drives the collet to a fully installed position. The matching tapers substantially contact each other thereby preventing a further deflection of the legs, locking the clip to the stud. Tabs retain the collet in a fully driven or installed position. For serviceability, the collet can be pried back up with a screwdriver freeing the clip for a straight pull removal. The clip can also be unscrewed in a conventional way.

BRIEF DESCRIPTION OF THE DRAWINGS

Further objects and advantages of the invention will become apparent from the following description and claims, and from the accompanying drawings, wherein:

FIG. 1 is a front plan view, partially in phantom, of the stud retainer embodiment of the present invention, shown in the as-manufactured or as-molded position.

FIG. 2 is a side plan view, partially in phantom, of the stud retainer embodiment of the present invention, shown in the as-manufactured or as-molded position.

FIG. 5 is a front plan view, partially in phantom, of the pipe clip embodiment of the present invention, shown in the pre-driven position.

FIG. 6 is a top plan view, partially in phantom, of the pipe clip embodiment of the present invention.

FIG. 8 is a perspective view of the locking clip embodiment of the present invention, shown in the pre-driven position.

FIG. 9 is a front plan view, partially in phantom, of the locking clip embodiment of the present invention, shown in the as-manufactured or as-molded position.

FIG. 10 is a side plan view, partially in phantom, of the locking clip embodiment of the present invention, shown in the as-manufactured or as-molded position.

DETAILED DESCRIPTION OF THE PREFERRED EMBODIMENT

Figure 3:
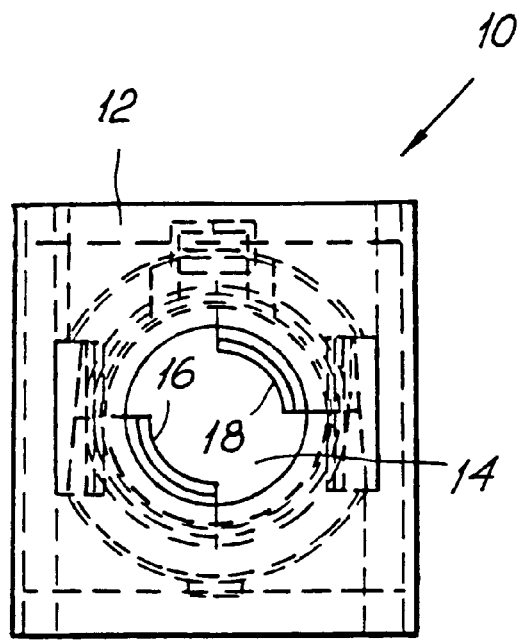
FIG. 3 is a bottom plan view, partially in phantom, of the stud retainer embodiment of the present invention.

Referring now to the drawings in detail wherein like numerals refer to like elements throughout the several views, one sees that FIG. 1 is a front plan view, partially in phantom of the stud retainer embodiment 10 of the present invention. Generally planar base 12 is formed with aperture 14 passing through a center thereof (also see FIG. 3). Alternately opposed internally threaded legs 16, 18 rise from base 12 and form 90° of the internal circumference of aperture 14, with 90° separating alternately opposed internally threaded legs 16, 18 from each other. The internal threads of legs 16, 18 are designed to engage an externally threaded structure such as a stud or other bolt-like structure (not shown). In the pre-driven positions shown in FIGS. 4a and 4b and additionally in the as-manufactured or as-molded positions as shown in FIGS. 1 and 2, there is enough flexibility within alternately opposed internally threaded legs 16, 18 that the stud or other bolt-like structure (not shown) can be inserted between threaded legs 16, 18 and threadedly engaged therebetween by a relatively linear motion, without the necessity for substantial rotational or screwing motion. External opposed sidewalls 20, 22 rise perpendicularly from base 12 and support planar top 27. First detent notch 25 is formed immediately downwardly adjacent from planar top 27. Second detent notch 29 is formed with cross-member 31 spans external opposed sidewalls 20, 22, above internally tapered wall 24 but below planar top 27.

Alternately opposed internally threaded legs 16, 18 have externally tapered walls 24, 26, respectively. Downwardly tapered partially toroidal channel 28 is formed between externally tapered walls 24, 26 of alternately opposed internally threaded legs 16, 18 and external opposed sidewalls 20, 22.

Plunger 30 includes head 32 and shaft 34. Collet 36 is formed at the bottom of shaft 34 and is initially molded as adjoining planar top 27. The connection between collet 36 and planar top 27 is subsequently broken in order to reach the pre-driven or fully driven position. Shaft 34 further is formed from horizontal elements 38, 40. Outwardly extending pre-drive positioning tabs 42, 44 are formed on collet 36 and horizontal element 38, respectively. Internal inclined wall 46 is formed within shaft 34 by the internal inclined surfaces of 48, 50, 52 of collet 36 and horizontal elements 38, 40, respectively. Internal inclined wall 46, as formed by internal inclined surfaces 48, 50, 52, has an angle of inclination complementary to that of externally tapered walls 24, 26. Cylindrical portion 54 is formed immediately below head 32 as part of shaft 34 and includes radially extending alignment element 56 and full drive retention tab 58.

Figure 4A:
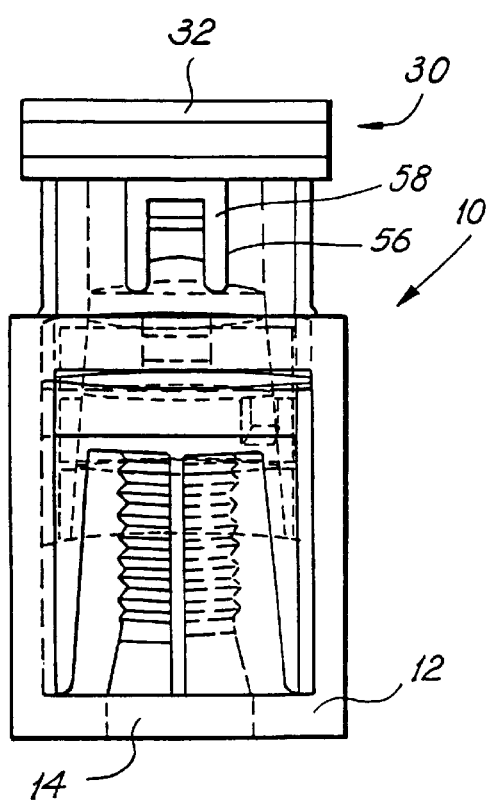
FIG. 4a is a front plan view, partially in phantom, of the stud retainer embodiment of the present invention, shown in the pre-driven position.
Figure 4B:
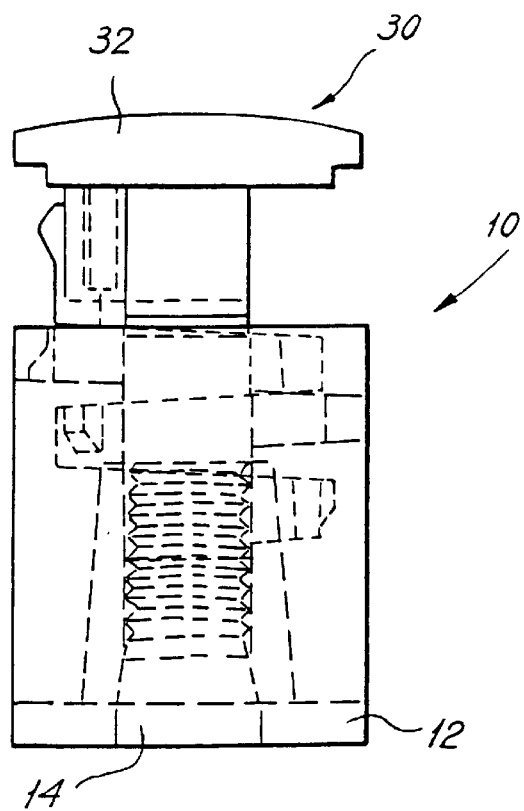
FIG. 4b is a side plan view, partially in phantom, of the stud retainer embodiment of the present invention, shown in the pre-driven position.
Figure 4C:
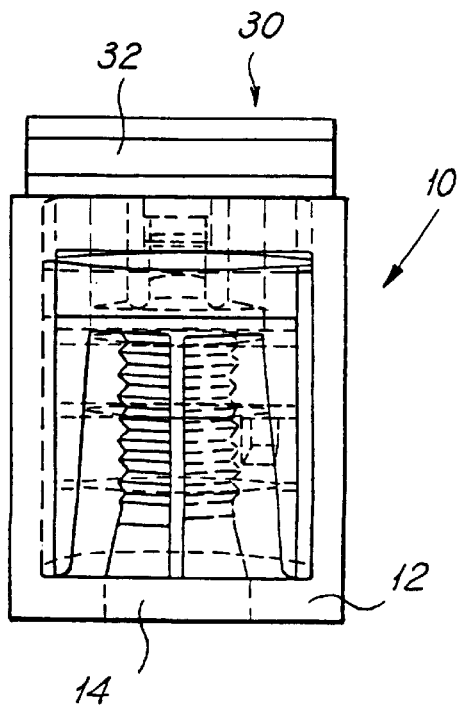
FIG. 4c is a front plan view, partially in phantom, of the stud retainer embodiment of the present invention, shown in the fully driven or installed position.
Figure 4D:
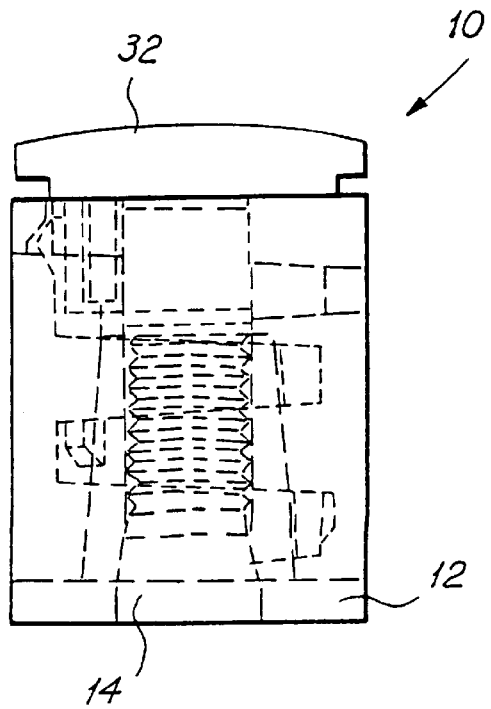
FIG. 4d is a side plan view, partially in phantom, of the stud retainer embodiment of the present invention, shown in the fully driven or installed position.
Figure 11:
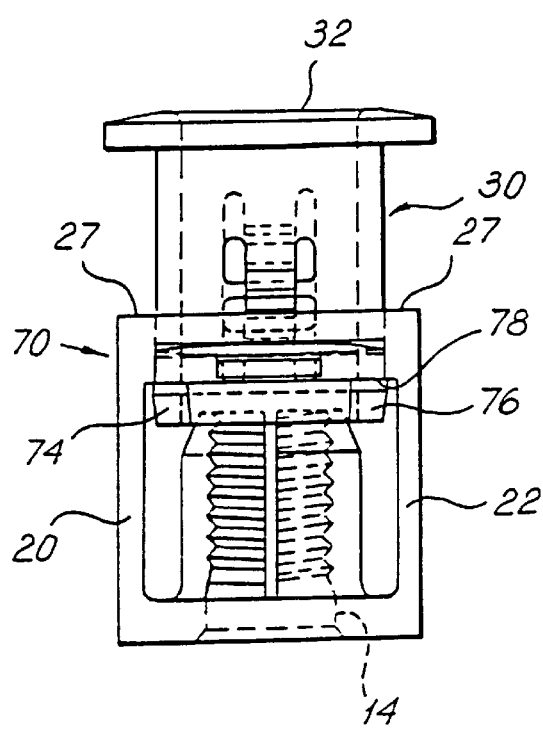
FIG. 11 a front plan view, partially in phantom, of the locking clip embodiment of the present invention, shown in the pre-driven position.
Figure 12:
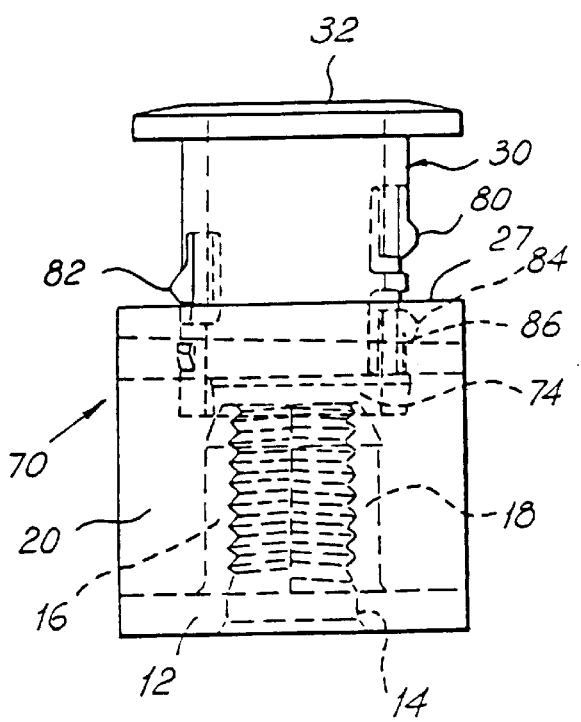
FIG. 12 is a side plan view, partially in phantom, of the locking clip embodiment of the present invention, shown in the pre-driven position.
Figure 13:
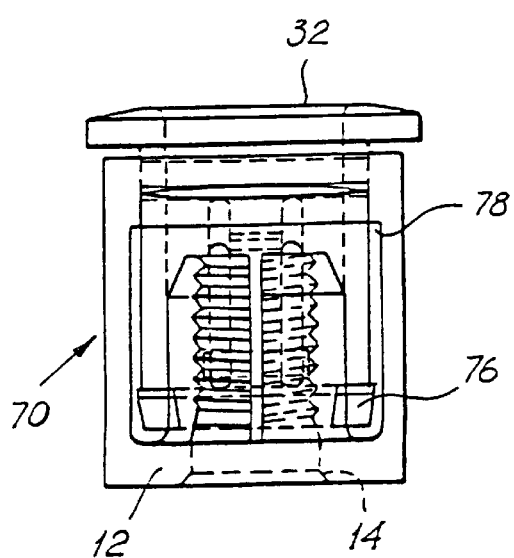
FIG. 13 is a front plan view, partially in phantom, of the locking clip embodiment of the present invention, shown in the fully driven or installed position.
Figure 14:
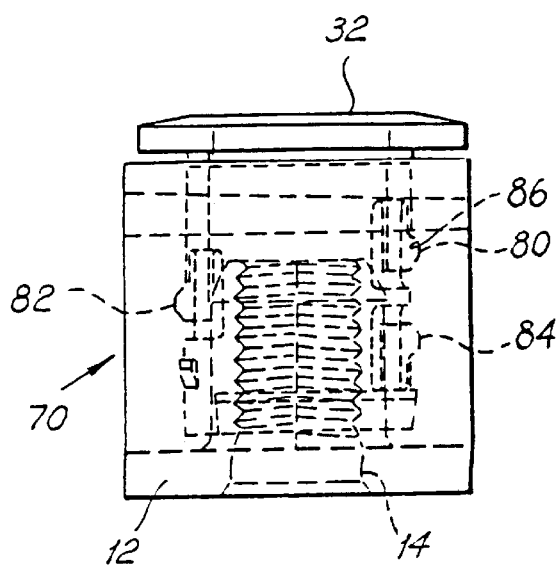
FIG. 14 is a side plan view, partially in phantom, of the locking clip embodiment of the present invention, shown in the fully driven or installed position.
Figure 15:
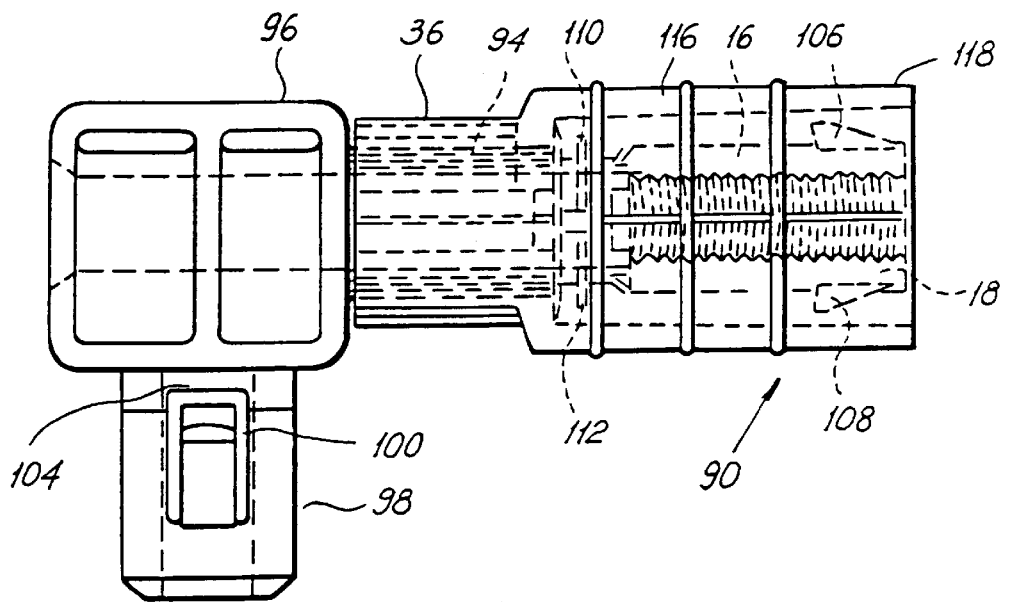
FIG. 15 is a side plan view, partially in phantom, of the rod end clip embodiment of the present invention, shown in the pre-driven position.
Figure 16:
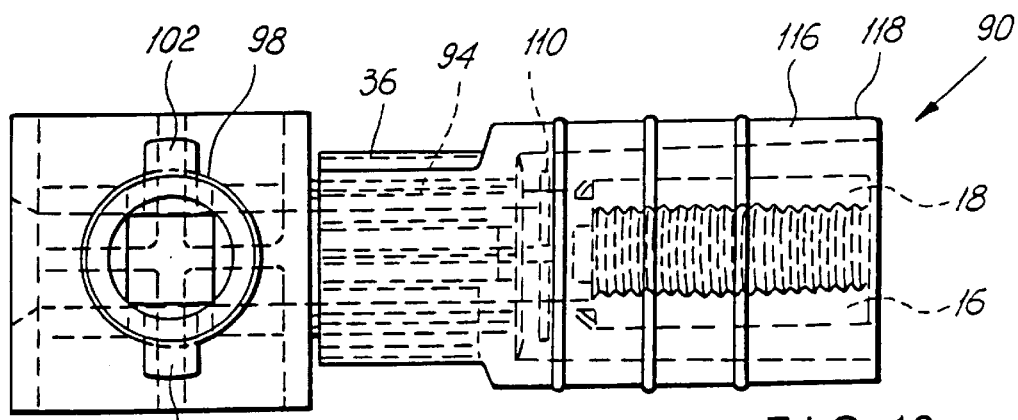
FIG. 16 is a top plan view, partially in phantom, of the rod end clip embodiment of the present invention, shown in the pre-driven position.
Figure 17:
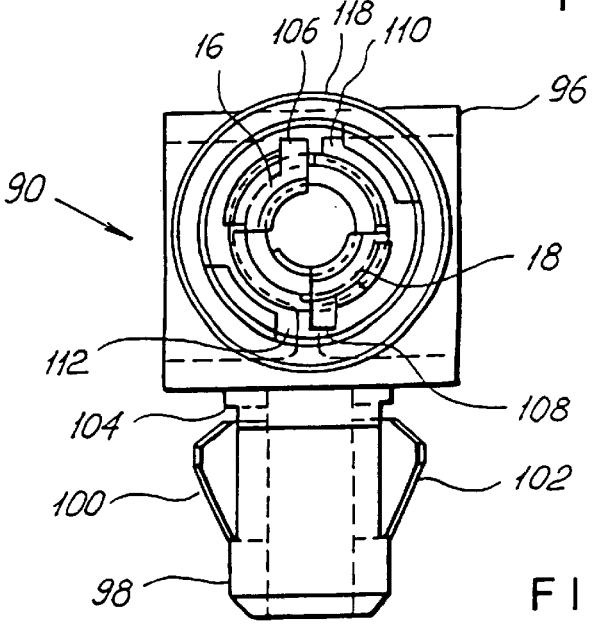
FIG. 17 is an end plan view, partially in phantom, of the rod end clip of the present invention.
Figure 18:
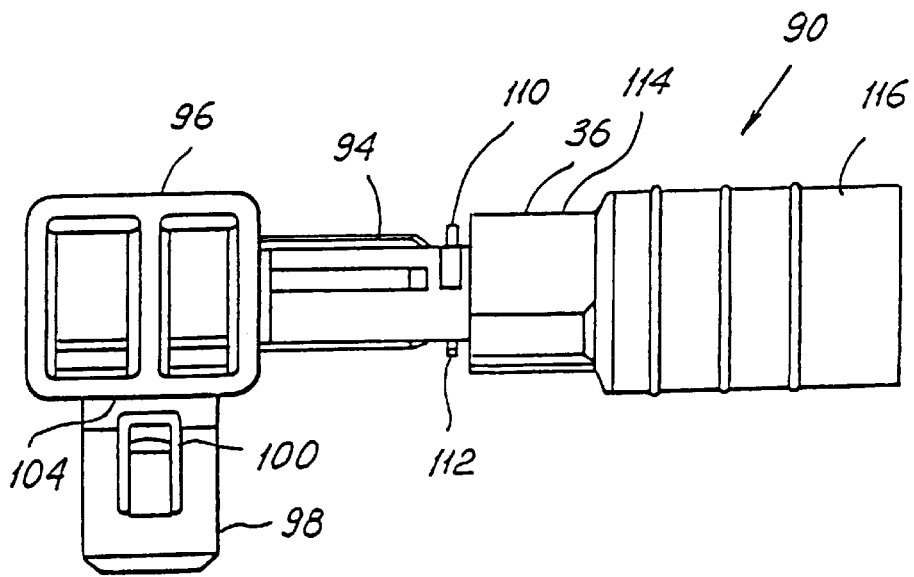
FIG. 18 is a side plan view of the rod end clip embodiment of the present invention, shown in the installed position.

In the pre-driven position shown in FIGS. 4a and 4b, outwardly extending pre-drive positioning tabs 42, 44 engage second detent notch 29 and first detent notch 25, respectively. After the pre-driven position is achieved and the stud (not shown) is engaged between alternately opposed internally threaded legs 16, 18, the installer typically drives plunger 30 downwardly to the fully driven position shown in FIGS. 4c and 4d so that full drive retention tab 58 engages first detent notch 25 and horizontal element 40 engages second detent notch 29. Most importantly, collet 36 extends through downwardly tapered partially toroidal channel 28 and internal inclined wall 46 engages externally tapered walls 24, 26 of internally threaded legs 16, 18, thereby locking the internal threads of legs 16, 18 against the externally threaded stud or other bolt-like element (not shown).

Figure 7:
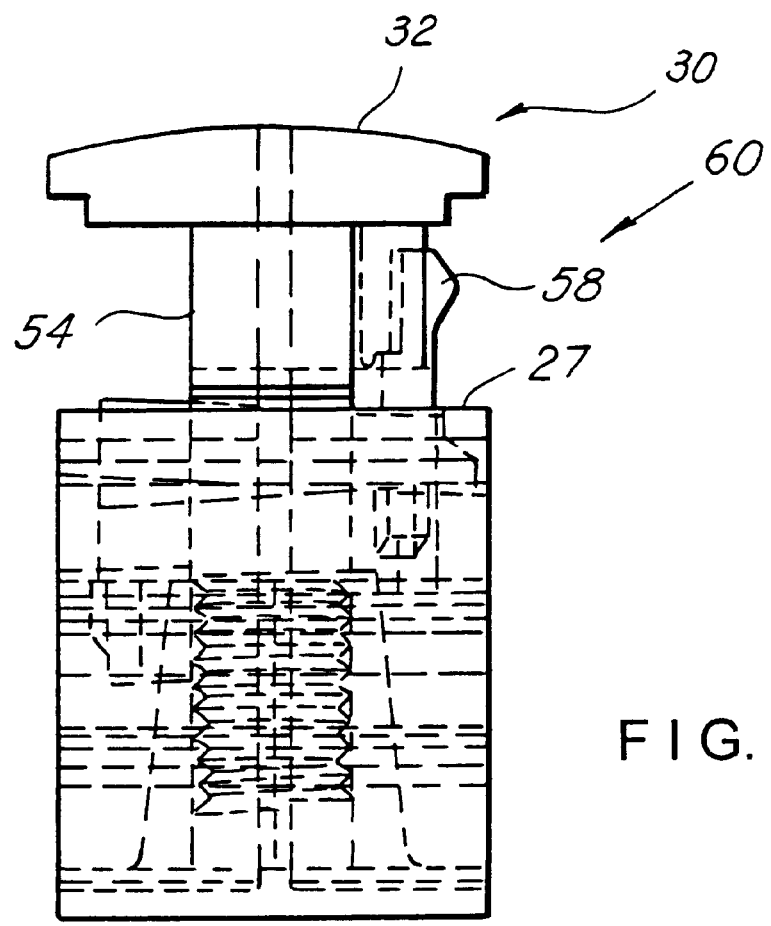
FIG. 7 is a side plan view, partially in phantom, of the pipe clip embodiment of the present invention, shown in the pre-driven position.

FIGS. 5, 6 and 7 disclose a pipe clip embodiment 60 of the present invention. Pipe clip embodiment 60 includes all of the elements of the stud retainer embodiment 10 and further includes pipe clip retaining elements 62, 64 integrally formed with and extending from sidewalls 20, 22, respectively.

FIGS. 8–14 disclose a locking clip embodiment 70 of the present invention. Locking clip embodiment 70 is similar to stud retainer embodiment 10. However, plunger 30 includes cylindrical wall 72 with collet retention tabs 74, 76 at a lower end thereof. Collet retention tabs 74, 76 are formed integrally with planar top 27 in the as-molded or as-manufactured position shown in FIGS. 9 and 10. This connection between the collet retention tabs 74, 76 and planar top 27 is subsequently broken to reach the pre-driven or fully driven position. Collet retention tabs 74, 76 engage edge 78 formed underneath planar top 27 in the pre-driven position shown in FIGS. 11 and 12 and abut base 12 in the fully driven position shown in FIGS. 13 and 14.

Full drive retention tab 80 is formed at a relatively upward portion of plunger 30 and pre-drive positioning tabs 82, 84 are formed at somewhat lower positions along plunger 30. As can be seen from FIG. 12, in the pre-driven position, pre-drive positioning tab 82 abuts planar top 27 while pre-drive positioning tab 84 engages detent notch 86 formed within planar top 27. As can be seen from FIG. 14, in the fully driven position, full drive retention tab 80 engages detent notch 86.

FIGS. 15–19 disclose the rod end clip embodiment 90 of the present invention. Alternately opposed internally threaded legs 16, 18 are integrally molded on end 92 of cylindrical support 94 and shares a common longitudinal axis therewith. Cylindrical support 94 likewise integral with generally cubic body 96 which, in turn, is integral with panel clip 98. Panel clip 98 is oriented at a right angle with respect to cylindrical support 94 and legs 16, 18. Panel clip 98 is generally cylindrical for being inserted through an aperture of a panel (not shown), and further includes radially extending wings 100, 102 so that a panel can be engaged within gap 104 formed between wings 100, 102 and cubic body 96. Full drive retention wings 106, 108 extend radially outwardly from legs 16, 18 respectively. Pre-drive positioning tabs 110, 112 are formed radially outward proximate to end 92 of cylindrical support 94.

Figure 19:
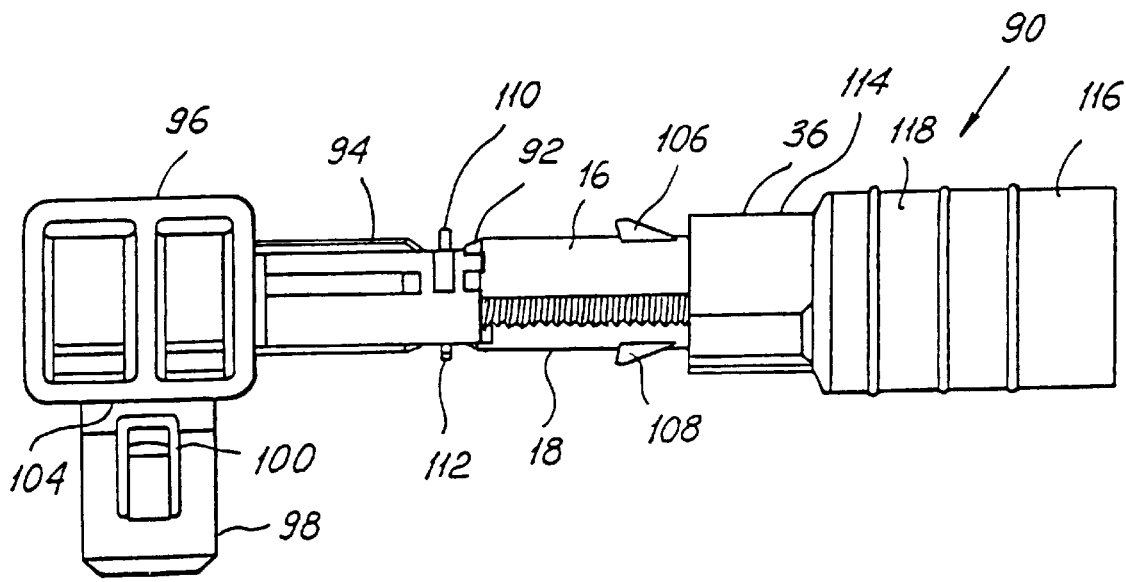
FIG. 19 is a side plan view of the rod end clip embodiment of the present invention, shown in the as-manufactured or as-molded position.

Collet 36 is formed as a narrowed neck 114 of externally sliding plunger 116. Sliding plunger 116 further includes enlarged portion 118. Narrowed neck 114 is initially molded at the ends of legs 16, 18 as shown in FIG. 19. The integral connection between narrowed neck 114 and legs 16, 18 is subsequently broken to reach the pre-driven or fully driven positions. In order to reach the pre-driven position, narrowed neck 114 is driven past legs 16, 18 to engage cylindrical support 94 in the position shown in FIGS. 15 and 16 and is held in this position by cylindrical body 96 on one end and pre-drive positioning tabs 110, 112 on the other end. In order to reach the fully driven position or installed position shown in FIG. 18 from the pre-driven position of FIGS. 15 and 16, the sliding plunger 116 is withdrawn away from cubic body 96 so that narrowed neck 114 is positioned between full drive retention wings 106, 108 and pre-drive positioning tabs 110, 112 and engaging legs 16, 18 thereby limiting deflection of legs 16, 18 and locking legs 16, 18 about an externally threaded stud or other bolt-like structural element.

In order to install any of the embodiments 10, 60, 70, 90 of the present invention, the installer typically begins in the respective pre-driven position wherein legs 16, 18 have an ability to deflect. The user then inserts an externally threaded stud or other bolt-like structure between legs 16, 18 and urges collet 36 to the fully driven position thereby limiting the deflection of legs 16, 18 and locking legs 16, 18 to the stud. Other connections, such as to pipes or wires with pipe clip 60 or to a panel such as with rod end clip 90, may be done before or after the locking of legs 16, 18 as described above.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A clip including:
   a plurality of internally threaded legs forming a base having an aperture therein,
   sidewalls rising from said base to an upper surface having an opening therein;
   a collet which passes through said opening and moves from a pre-driven position to a fully driven position, wherein said collet is substantially free of engagement with said plurality of internally threaded legs in said pre-driven position thereby allowing flexure of said plurality of internally threaded legs and wherein said collet encircles and engages said plurality of internally threaded legs in said fully driven position, thereby inhibiting flexure of said plurality of internally threaded legs.

2. The clip of claim 1 further including a plunger affixed to said collet.

3. The clip of claim 2 further including protrusions outwardly extending from said plunger for engaging detent notches in said pre-driven position and in said fully driven position.

4. The clip of claim 3 wherein said collet is initially molded integral with said upper surface and thereafter disattached therefrom.

5. The clip of claim 3 further including pipe clip elements extending from said sidewalls.

6. The clip of claim 3 wherein said plunger is of a hollow cylindrical shape for surrounding said plurality of internally threaded walls in said fully driven position.

7. The clip of claim 1 wherein said plurality of internally threaded legs are formed on a cylindrical support of a first diameter and further including a plunger with a first portion of a first internal diameter equal to said first diameter and a second portion of a second internal diameter, said second internal diameter being greater than said first internal diameter, said collet being formed on said first portion of said first internal diameter, and wherein, in said pre-driven position, said collet engages said cylindrical support and said second diameter is radially outward from said plurality of internally threaded legs.

\* \* \* \* \*